(12) United States Patent
Harris et al.

(10) Patent No.: US 6,401,819 B1
(45) Date of Patent: Jun. 11, 2002

(54) METHODS FOR DEPOSITION OF MATERIALS IN UNDERGROUND RESERVOIRS

(75) Inventors: Ralph Edmund Harris, Horsham; Ian Donald McKay, Yateley, both of (GB)

(73) Assignee: Cleansorb Limited, Hampshire (GB)

( * ) Notice: Subject to any disclaimer, the term of this patent is extended or adjusted under 35 U.S.C. 154(b) by 0 days.

(21) Appl. No.: 09/463,317

(22) PCT Filed: Jul. 17, 1998

(86) PCT No.: PCT/GB98/02117

§ 371 (c)(1),
(2), (4) Date: Apr. 28, 2000

(87) PCT Pub. No.: WO99/05394

PCT Pub. Date: Feb. 4, 1999

(30) Foreign Application Priority Data

Jul. 23, 1997 (GB) ............................................. 9715593
Dec. 5, 1997 (GB) ............................................. 9725904

(51) Int. Cl.⁷ ............................................. E21B 33/13
(52) U.S. Cl. ....................... 166/300; 166/270; 166/295; 166/304
(58) Field of Search ........................ 166/270, 293–295, 166/300, 304, 305.1

(56) References Cited

U.S. PATENT DOCUMENTS

| 3,696,622 | A |   | 10/1972 | Tohma et al. |
| 3,732,927 | A |   | 5/1973  | Richardson |
| 3,974,077 | A |   | 8/1976  | Free |
| 4,002,204 | A |   | 1/1977  | Cavin |
| 4,287,951 | A |   | 9/1981  | Sydansk et al. |
| 5,143,155 | A |   | 9/1992  | Ferris et al. |
| 5,236,046 | A | * | 8/1993  | Robinson et al. ............ 166/270 |
| 5,437,331 | A |   | 8/1995  | Gupta et al. |
| 5,609,209 | A |   | 3/1997  | Shu |
| 5,678,632 | A | * | 10/1997 | Moses et al. ................ 166/307 |
| 5,730,873 | A |   | 3/1998  | Hapka et al. |
| 5,813,466 | A | * | 9/1998  | Harris et al. ................ 166/300 |

FOREIGN PATENT DOCUMENTS

WO          94/25731       11/1994

* cited by examiner

Primary Examiner—David Bagnell
Assistant Examiner—Zakiya Walker
(74) Attorney, Agent, or Firm—Nixon & Vanderhye

(57) ABSTRACT

A method of precipitating or depositing material within an underground reservoir which comprises introducing into the reservoir in aqueous solution (i) an isolated enzyme and (ii) a substrate for the enzyme, such that the action of the enzyme on the substrate leads to the precipitation or deposition of material within the underground reservoir.

26 Claims, No Drawings

METHODS FOR DEPOSITION OF MATERIALS IN UNDERGROUND RESERVOIRS

The method of this invention is generally applicable to the control of fluid movement in underground reservoirs through the reduction of the porosity or permeability of the geological formation. The method is especially suitable for use in the recovery of oil and gas from hydrocarbon containing reservoirs.

During oil production operations, a range of problems are encountered arising from the unwanted breakthrough of an overlying gas body, or an edge or bottom water, to the production well by coning or channelling. This is a particular problem where reservoir heterogeneities such as fractures or high permeability streaks are selectively depleted of oil, allowing the premature entry of adjacent gas or water into the production zone. In heavy oil reservoirs, channelling or fingering of water through the relatively immobile oil phase can result in loss of heavy oil production.

A range of methods have been employed in order to increase the recovery of oil from underground reservoirs. In one form of enhanced recovery, a drive fluid is injected under pressure into the oil reservoir through one or more injection wells to maintain, restore or produce formation pressure. The most widely used drive fluid is water. More complex aqueous systems, such as those containing polymer or surfactant, or other fluids such as solvents or gases may also be used. Steam may be used for heavy oils. The drive fluid is often introduced into the oil-bearing underground formation near the bottom of the formation at or above reservoir pressure, to displace oil in the formation. As the fluid moves through the reservoir, it drives or flushes the oil through the formation. An increasing oil saturation develops ahead of the moving fluid and finally reaches the production well or wells. Generally, an oil-bearing underground formation will consist of various regions having different permeabilities. Drive fluid moves preferentially through the regions of higher permeability and in so doing, bypasses oil contained in much lower permeability regions. This obviously reduces the sweep efficiency of the displacing medium.

The flow of fluids through the formation may be modified to improve the production of oil. Reducing the permeability of selected regions can reduce coning, channelling or fingering or improve the sweep efficiency during primary, secondary or enhanced production.

A number of approaches have been proposed to reduce permeability. Processes which use crosslinked polymers or other types of gels have been most common. Other processes using foams, emulsions, suspended solids, microorganisms and precipitates have also been proposed (Seright, R. S. & Liang, J.; Paper SPE 30120 A Comparison of Different Types of Blocking Agents. pp. 431–440 In Proceedings of the European Formation Damage Control Conference, May 15–16, 1995, The Hague, The Netherlands). A number of these processes use hazardous chemicals. Thermal or bacterial degradation of the blocking agent may occur.

The precipitation or deposition of materials within the formation may arise from mixing two or more incompatible chemical solutions in the formation or selectively removing a chemical or chemicals which keep other chemicals in solution. If the process occurs rapidly, however, placement of the precipitate can be difficult.

Ferris and Stehmeier (U.S. Pat. No. 5,143,155) teach that bacteria may be used to precipitate minerals from an aqueous system. Growth of the bacteria on nutrients is required before the minerals are precipitated, allowing some time to place the fluid. However, bacterial systems suffer from a number of potential disadvantages. Nutrients must be supplied. These may be used by organisms other than the intended species or strains, either introduced or indigenous. The bacteria must grow under the reservoir conditions of temperature, pH and salinity. These are often sub-optimal for the preferred organisms. The efficiency of conversion of growth nutrients to desirable products is often low. Bacteria may produce different metabolic products to those intended. The degree of control over the system, including the rate at which precipitation occurs is limited. In addition, bacteria may not readily enter anything other than a high permeability formation due to their size.

Acidising of underground reservoirs using a combination of esterase or lipase enzymes and esters has already been described (PCT/GB94/00922, PCT/GB95/01295). The use of the produced acid to precipitate or deposit other chemicals was not taught.

The present invention teaches the use of enzymes to precipitate or deposit materials within an underground reservoir. Preferably the underground reservoir is a hydrocarbon, for example gas or oil, or water reservoir. The method of precipitating or depositing chemicals within underground reservoirs comprises introducing into the reservoir in aqueous solution (i) an enzyme and (ii) a substrate for said enzyme, such that the action of the enzyme on the substrate leads to the precipitation or deposition of material within the underground reservoir.

The material which is precipitated or deposited may be present, in whole or in part, in the reservoir before the introduction of the enzyme and the substrate.

Alternatively, the material is precipitated or deposited from an aqueous solution or dispersion (iii) introduced into the reservoir in addition to the enzyme and substrate. It is preferable but not essential to use an aqueous solution or dispersion (iii).

It is necessary to select an enzyme which remains active under reservoir conditions. The following parameters are generally taken into consideration:

1) Temperature Tolerance

The temperature of a reservoir is a function of its depth and can be in excess of 100° C. Many onshore reservoirs and some offshore reservoirs in carbonate formations are fairly shallow with temperatures falling within the 30–60° C. range. Generally the enzymes used in the method of the present invention are active between 15° C. and 110° C., for example between 15° C. and 95° C. but an enzyme which is active at higher temperatures may also be used. The enzymes used in the process of the invention have a range of temperatures over which they are active. When there is a temperature gradient in the oil/gas well, it may be desirable to use two or more enzymes together to ensure reliable operation over the temperature range within the well.

2) Pressure Tolerance

Pressure is also a function of depth. Pressures in offshore reservoirs in, for example, the North Sea may exceed 500 atmospheres, whereas shallower on-shore fields are likely to be in the range 50–150 atmospheres. If enzymes are to be injected at rates above fracture pressure, they must withstand injection pressures which will exceed reservoir pressure.

3) Salt Tolerance

The ability to withstand high salt levels is important as reservoir brines can often be near saturated solutions. Enzymes may be injected in fresh water, but they will need to withstand the effects of salts diffusing into that fresh water.

4) Oil Tolerance

Enzymes must be tolerant of oil although they may remain in the aqueous phase within the reservoir.

The enzyme used in the method of the present invention is generally a water soluble enzymrte. It is advantageous for the enzyme to be readily water soluble. Preferably the enzyme is a hydrolase (EC 3) such as a lipase (EC 3.1.1.3), an esterase (EC 3.1.1.1) or a urease (EC 3.5.1.5) or an oxidoreductase (EC 1.) such as an oxidase or peroxidase.

Typically isolated enzymes are used. Enzymes may be isolated from plant, animal, bacterial or fungal sources. The enzymes may be produced from wild-type, conventionally bred, mutated or genetically engineered organisms. The enzymes may, optionally, be chemically modified, as long as they retain or possess a desired catalytic ability. Individual enzymes are selected for their ability to act on the selected substrate, producing a desired change under the conditions of the underground reservoir. Preferably, the enzymes will be industrial enzymes available in bulk from commercial sources.

The substrate is generally a chemical substrate. The substrate for the enzyme and other materials required for the process will normally be technical grade to reduce the cost of the process.

Enzyme-substrate combinations which are considered to be particularly useful for isolated enzyme based deposition processes are: esterases or lipases plus esters; ureases plus urea; phosphatases plus organic phosphates; oxidases or peroxidases plus phenols; and oxidases or peroxidases plus anilines.

Preferably the aqueous solution or dispersion (iii) comprises a salt of Na, Ca, Si, Mg, Al, or Fe such as calcium chloride, sodium bicarbonate, ferrous sulphate, ferric chloride, aluminium chloride, aluminium sulphate, magnesium chloride, colloidal dispersions of silica or an organic compound capable of forming a resin or gel or a polymer capable of being crosslinked to form a gel and a crosslinking agent or a mixture thereof. The presence of a metal salt may, in alkali conditions, result in the formation of one or more metal hydroxides.

The precipitated or deposited material is typically a mineral, a gel, or a resin. Examples of each of these are provided. We do not wish to be limited to these examples. Other combinations of enzymes, substrates and aqueous solutions or dispersions (iii) which may result in the precipitation or deposition of materials will be apparent to those skilled in the art.

Suitable combinations of enzyme and substrate will depend on the prevailing conditions in the reservoir. For example, it may not be suitable to use an acid producing combination of enzyme and substrate, in the presence of acid soluble material such as carbonate. The acid would react with the carbonate and the pH of the solution would remain high. This may prevent the precipitation or deposition of materials, particularly if the precipitation or deposition requires acidic conditions. This is more likely to be the case in carbonate formations or in sandstone formations where significant amounts of carbonate weighted drilling fluids have been used. Possible limitations to the operation of individual systems will be apparent to those skilled in the art and will help determine the choice of system for the particular conditions encountered.

The solution or solutions of enzyme, substrate and additional chemicals may be prepared in suitable water for example city (drinking) water, produced water, fresh water (for example water from lakes, rivers or ponds) or seawater. The solutions may be prepared batchwise in tanks or other suitable vessels or prepared by adding these components to the water on a continuous, preferably controlled and monitored basis ("on the fly") as the water is injected into the reservoir.

Suitable concentrations of substrate and the material present in the aqueous solution or dispersion (iii) (if used) will depend on the required amount of precipitation or deposition. This will depend on the specific system chosen but will typically be of the order of 1 to 50 grams per litre, although higher or lower concentrations may be appropriate in some situations. The enzyme concentration will be selected to produce precipitation or deposition within the desired period of time for particular enzyme-substrate-additional chemical combinations. Typical enzyme concentrations will be 0.0001% to 2% v/v of commercial liquid enzyme preparations, preferably 0.001 to 1% v/v or the equivalent activity of dried enzyme preparation.

Solutions of the enzyme, substrate and the aqueous solution or dispersion (iii) are conveniently introduced into the underground reservoir via injection or production wells.

They will normally be introduced at below fracture pressure but may be injected at above fracture pressure. A single solution containing all of the components may be used or more than one solution containing individual components or two or more components may be used. More than one enzyme-substrate-aqueous solution or dispersion (iii) combination may be used at one time, if compatible.

Oxidases and peroxidases useful in the process of the present invention require either molecular oxygen (dioxygen) or a peroxide as an electron acceptor. Suitable enzymes include horseradish peroxidase, soybean peroxidase, chloroperoxidases, haloperoxidases, lactoperoxidase, oxidases, laccase and tyrosinase. Preferably molecular oxygen or a molecular oxygen containing gas is used as an electron acceptor with an oxidase and a peroxide is used as an electron acceptor with a peroxidase. Peroxides known to be useful as electron acceptors for peroxidases include hydrogen peroxide, alkyl peroxides such as ethyl peroxide or methyl peroxide, aromatic peroxides and peroxy acids.

When one or more electron acceptors are needed they can conveniently be introduced into the underground reservoir via injection or production wells. They may be introduced as a solution containing molecular oxygen or a peroxide or as a solution or dispersion containing compounds which decompose to liberate molecular oxygen or peroxides.

Suitable compounds include perborates, percarbonates, perphosphates, persilicates, hydrogen peroxide adducts such as urea hydrogen peroxide and magnesium peroxide. Molecular oxygen or molecular oxygen containing gases or peroxides or other required reactants or precursors of the reactants may be introduced as a foam.

When hydrogen peroxide is required for use with a peroxidase, it may be generated from molecular oxygen using an oxidase enzyme or enzymes introduced into the underground reservoir together with a suitable substrate or substrates. Suitable combinations of substrates and oxidase enzymes include glucose plus glucose oxidase (EC 1.1.3.4), urate plus urate oxidase (EC 1.7.3.3), galactose plus galactose oxidase (EC 1.1.3.9), alcohols plus alcohol oxidase (EC 1.1.3.13), amines plus amine oxidase (EC 1.4.3.4, EC 1.4.3.6) and amino acids plus amino acid oxidase (EC 1.4.3.2, EC 1.4.3.3).

The solutions may also be injected sequentially, with or without spacer fluids. Some mixing of reservoir water and injected aqueous solutions will occur in the reservoir. In optimising the systems for given reservoir conditions, the composition of the reservoir water and the water used to make up the solutions to be injected (for example city (drinking) water, produced water, fresh water (for example water from lakes, rivers or ponds) or seawater) may be taken into consideration. Individual waters may contribute significant amounts of an ion required for a particular precipitation or deposition process.

The treatment fluids introduced into the formation may optionally contain materials which act as a focal point for nucleation. This may assist in the precipitation of minerals such as calcium carbonate from the supersaturated solutions formed as a result of the action of the enzymes on their substrates.

The well may be shut in after introduction of treatment fluid or fluids or injection or production from operations continued. Ordinarily, if treatment fluids are introduced into an injector well, injection of fluid into the well will be continued. If the fluid is intended for sand consolidation, the well may be shut in for a period of time, typically between 1 hour and a week, preferably 6–48 hours, to allow effective consolidation. If the fluid is intended to precipitate or deposit production chemicals in the near wellbore vicinity, a similar shut in period may be required.

Enzymes have a number of advantages over bacteria for the controlled production of chemicals in oilfield environments. Suitable enzyme preparations often have several months shelf life at ambient temperature. Their efficiency of conversion of substrates to products may be very high. The kinetics of production can be accurately controlled in contrast to systems which depend on the growth of bacteria where lag times can generally vary. There is no requirement for growth nutrients to be provided for enzyme-based systems. Growth nutrients are often a costly component of systems based on bacteria. Introduction of growth nutrients into a reservoir may encourage the growth of undesirable organisms. Enzymes can be used in the presence of certain biocides. The conditions under which enzymes can operate are in general more extreme than those tolerated by bacteria. Enzymes are therefore more suited to oilfield operations. For example, industrial enzymes are known which are tolerant of temperatures up to 110° C., extremes of pH from about 2 to about 12 and saturated salt solutions.

The rate of production of materials by enzymes can be accurately controlled, and the system can be manipulated in a variety of ways such that precipitation or deposition of chemicals occurs within a given time scale. This allows the fluid to be placed in the target zone before precipitation or deposition occurs. Ways in which the system can be controlled include varying the concentration of enzyme, varying the concentration of substrate, varying the concentration of the material present in the aqueous solution or dispersion (iii), encapsulation of the enzyme to give a controlled release and the incorporation of varying quantities of buffer to maintain the pH within a given range for a predetermined period of time in systems where acid or alkali production would otherwise result in precipitation or deposition of chemicals.

The precipitation or deposition of material may be caused by a change in the pH of the solution. For example, a lipase or esterase enzyme in combination with an ester produces an acid which reduces the pH of the system. In the presence of an aqueous solution containing phenol and formaldehyde this reduction in pH can result in the formation of a phenol-formaldehyde resin. In the presence of a slurry of calcium silicate acid conditions will destabilize the slurry and lead to the formation of a gel. On the other hand, a urease enzyme in combination with urea produces ammonia which increases the pH of the system. If the solution contains sodium bicarbonate and calcium chloride the increase in pH causes the precipitation of calcium carbonate. If the solution contains guar and borate the increase in pH causes a gel to form. If the solution contains at least one suitable metal salt the increase in pH causes at least one metal hydroxide to form. In the presence of smectite clays such as bentonite, keolinite or montmorillonite the metal hydroxide may form a complex with the clay.

Alternatively, the combination of the enzyme and the substrate can produce a product which can react with another material in the solution to produce an insoluble product. For example, a phosphatase enzyme, in combination with calcium glycerophosphate produces an inorganic phosphate, if the solution contains calcium chloride calcium phosphate is precipitated. Oxidation of phenols by oxidase or peroxidase enzymes can produce precursors which readily polymerise to form phenolic resins. Similarly, oxidation of anilines by oxidase or peroxidase enzymes can produce precursors which readily polymerise to form polyanilines.

In a further embodiment of the invention, the enzyme-based precipitation or deposition of material may be employed to consolidate sand. An increase in the mechanical strength of the formation by the precipitation or deposition of materials may significantly reduce the risk of sand production and/or formation collapse during hydrocarbon production.

Another embodiment of the invention is to use the enzyme-based precipitation or deposition of materials to precipitate or deposit materials such as scale inhibitors, corrosion inhibitors, paraffin inhibitors, asphaltene inhibitors or similar production chemicals within the formation, so that low concentrations of these chemicals may be released at a controlled rate over a given period of time.

In many underground reservoirs sufficient precipitation or deposition will occur if the reservoir is treated once with one enzyme/substrate system. In other underground reservoirs it may be necessary to repeat the treatment with a given enzyme/substrate system one or more times and/or to use more than one enzyme/substrate system simultaneously, sequentially or separately.

The following Examples illustrate the invention.

EXAMPLE 1

A urease enzyme, in combination with urea will produce carbon dioxide and ammonia which increases the pH of the system. In the presence of an aqueous solution of calcium such as calcium chloride the rise in pH reduces the solubility of the calcium which is precipitated as calcium carbonate.

A solution containing 20 g urea, 10 g ammonium chloride, 2.1 g sodium bicarbonate and 2.8 g calcium chloride per litre of distilled water was prepared. The pH was adjusted to 6.0. Jack Bean urease obtained from Sigma-Aldrich was added to 1.5 mg/ml. At 25° C. visible precipitation of calcium carbonate occurred after 3 minutes. The appearance of the precipitation was followed in a spectrophotometer by measuring the absorbance at 600 nm. The incorporation of Tris-HCl buffer at 10, 20 and 30 mM delayed the onset of precipitation by approximately 1 minute per 10 mM Tris HCL.

The pH at which visible precipitate formation started was approximately pH 8. The rate of formation of precipitate was observed to be proportional to the amount of enzyme added.

The reaction rate in this example is higher than that likely to be used in underground reservoirs. Rapid precipitation allows monitoring of the reaction using a spectrophotometer. Longer incubations would result in settling of the precipitate requiring another method of following the reaction. Reducing the amount of enzyme used would result in the reaction taking place over a longer period, say 1 to 6 hours.

This example also shows that one of the controls which can be exerted over the precipitation or deposition process is the introduction of quantities of a suitable buffer, which delay the onset of precipitation or deposition proportional to the amount of buffer added.

EXAMPLE 2

A phosphatase enzyme, in combination with calcium glycerophosphate will hydrolyse the glycerophosphate to produce inorganic phosphate. In the presence of an aqueous solution of calcium such as calcium chloride, calcium phosphate is precipitated.

A phosphatase enzyme was added to a solution containing 50 mM calcium chloride, and 50 mM calcium glycerophosphate. The initial solution was completely clear and the enzyme preparation contained no particulates. After about 20 minutes at 20° C. the solution became opaque due to the precipitation of white fines material. The appearance of the precipitate was followed in a spectrophotometer by measuring the absorbance at 600 nm. Increasing the amount of enzyme increased the rate of deposition.

EXAMPLE 3

A urease enzyme, in combination with urea will produce carbon dioxide and ammonia which increases the pH of the system. In the presence of an aqueous solution of guar gum and borate the rise in pH results in the formation of a crosslinked gel.

A low viscosity guar/borate solution was prepared as follows. One gram of powdered guar was dissolved in 200 mls water and the pH adjusted to 3.8 by drop wise addition of concentrated acetic acid. 1.25 ml of 4% v/v borax solution as added. After addition of the borate solution to the guar the pH of the guar/borate mixture stabilised at 3.7. Four grams of solid urea pellets were added and when these were fully dissolved the pH stabilised at 3.9. 0.05 g of powdered urease enzyme was then added. The pH was observed to rise. Three minutes after addition of the enzyme the pH became alkaline and the guar/borate mixture had formed a gel.

The rate at which gelation occurred was proportional to the amount of urease enzyme used.

EXAMPLE 4

An oxidase or peroxidase enzyme, in combination with a suitable electron acceptor will oxidise a phenol to a precursor which readily polymerises to form a phenolic resin.

A solution of 0.66% phlorglucinol (1,3,5-trihydroxybenzene) was made up in Tris-HCl pH 7.1 and Sigma Horseradish peroxidase added at 60 units per ml. Hydrogen peroxide was added dropwise over a two hour period to give a final concentration of 0.3%. The colour of the solution changed from colourless to red and an orange to yellow coloured material was observed to coat the inside of the polypropylene test tub after leaving overnight.

EXAMPLE 5

An oxidase or peroxidase enzyme, in combination with a suitable electron acceptor will oxidise an aniline to a precursor which readily polymerises to form polyaniline.

An aqueous solution containing 2.8% (v/v) of an aniline and 1.8% hydrogen peroxide was prepared and the pH adjusted to pH 7. The following were then added to the reaction mixture:

sufficient peroxidase enzyme to catalyze polymerization of all of the aniline overnight under acidic conditions; esterase substrate to a final concentration of 6% v/v; sufficient esterase enzyme to break down the ester substrate and reduce the pH to below 5 within a few hours. The reaction was carried out at room temperature and within 2 hours of adding the esterase enzyme the pH had dropped to below 5 and aniline polymer was evident as a fine cloudy orange precipitate.

EXAMPLE 6

A solution containing 1M $CaCl_2$ and 500 mM calcium glycerophosphate was prepared. Phosphatase enzyme was added in an amount sufficient to hydrolyse the glycerophosphate over a 48 hour period. After 72 hours at room temperature (20° C.) a gel was observed to have formed.

EXAMPLE 7

A urease enzyme, in combination with urea will produce ammonia and carbon dioxide and increase the pH of the system. In the presence of an aqueous solution of suitable metal salts, the rise in pH will result in the formation of metal hydroxides.

A solution containing 30 mM aluminium chloride, 30 mM magnesium chloride and 200 mM urea was adjusted to pH 3.8 with 1 M sodium hydroxide. Urease enzyme was added and the pH was observed to rise. After 16 hours the pH had risen to 9.3 and colloidal metal hydroxides were present.

What is claimed is:

1. A method of precipitating or depositing within an underground reservoir a material which is one of a resin, a gel, a mineral and an inhibitor, the inhibitor being selected from a scale inhibitor and an asphaltene inhibitor, wherein said method comprises introducing into the reservoir in aqueous solution (i) an isolated enzyme and (ii) a substrate for said enzyme, such that the action of the enzyme on the substrate leads to the precipitation or deposition of said material within the underground reservoir.

2. A method according to claim 1 wherein the material is precipitated or deposited from an aqueous solution or dispersion (iii) introduced into the reservoir in addition to (i) and (ii).

3. A method according to claim 2 wherein the aqueous solution or dispersion (iii) comprises a component which is selected from a salt of a metal which is one of Na, Ca, Mg, Si, Al and Fe; an organic compound capable of forming a resin or gel; a polymer capable of being crosslinked to form a gel and a crosslinking agent; and mixtures thereof.

4. A method according to claim 2 wherein the enzyme is selected from an oxidase and a peroxidase, the substrate is a phenol and the aqueous solution or dispersion (iii) contains an electron acceptor.

5. A method according to claim 2 wherein the enzyme is selected from an oxidase and a peroxidase, the substrate is an aniline and the aqueous solution or dispersion (iii) contains an electron acceptor.

6. A method according to claim 1 wherein the precipitation or deposition is caused by a change in pH of the aqueous solution.

7. A method according to claim 6 wherein the pH is reduced.

8. A method according to claim 6 wherein the pH is increased.

9. A method according to claim 1 wherein the enzyme is a hydrolytic enzyme.

10. A method according to claim 9 wherein the hydrolytic enzyme is selected from an esterase, lipase, urease and phosphatase enzyme.

11. A method according to claim 1 wherein the enzyme is an oxidoreductase.

12. A method according to claim 11 wherein the oxidoreductase enzyme is selected from oxidase and peroxidase enzyme.

13. A method according to claim 1 wherein the substrate is a chemical substrate.

14. A method according to claim 13 wherein the chemical substrate is selected from an ester, urea, a phenol, an aniline and a phosphate containing organic compound.

15. A method according to claim 1 wherein the enzyme is a urease and the substrate is urea.

16. A method according to claim 15 wherein the aqueous solution or dispersion (iii) contains calcium chloride.

17. A method according to claim 15 wherein the aqueous solution or dispersion (iii) contains guar gum and an agent selected from sodium tetraborate, other borates and boric acid.

18. A method according to claim 15 wherein the aqueous solution or dispersion (iii) contains at least one metal salt suitable for yielding a metal hydroxide under alkaline conditions.

19. A method according to claim 18 wherein the aqueous solution or dispersion (iii) contains aluminium chloride and magnesium chloride.

20. A method according to claim 1 wherein the enzyme is a phosphatase and the substrate is calcium glycerophosphate.

21. A method according to claim 1 wherein the enzyme is selected from an esterase and a lipase and the substrate is an ester.

22. A method according to claim 21 wherein the aqueous solution or dispersion (iii) contains phenol and formaldehyde.

23. A method according to claim 1 wherein the enzyme is in the form of a delayed release formulation.

24. A method according to claim 1 wherein the permeability of an underground reservoir is reduced.

25. A method according to claim 1 wherein sand present in the underground reservoir is consolidated.

26. A method according to claim 1 wherein an inhibitor selected from a scale inhibitor, a corrosion inhibitor, a paraffin inhibitor, an asphaltene inhibitor and mixtures thereof is deposited within the underground reservoir.

* * * * *